June 10, 1969
C. SAGONA
3,448,523
HIGH PRECISION LENGTH-MEASURING AND GAGING INSTRUMENTS
HAVING OPTIONALLY-USEABLE DIAL INDICATING MEANS
Filed April 18, 1967
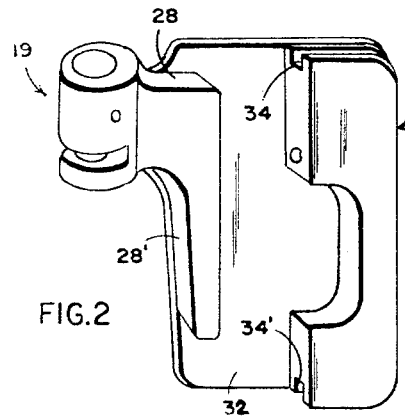
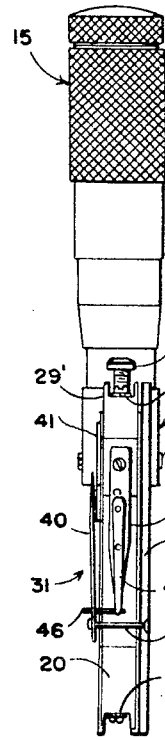
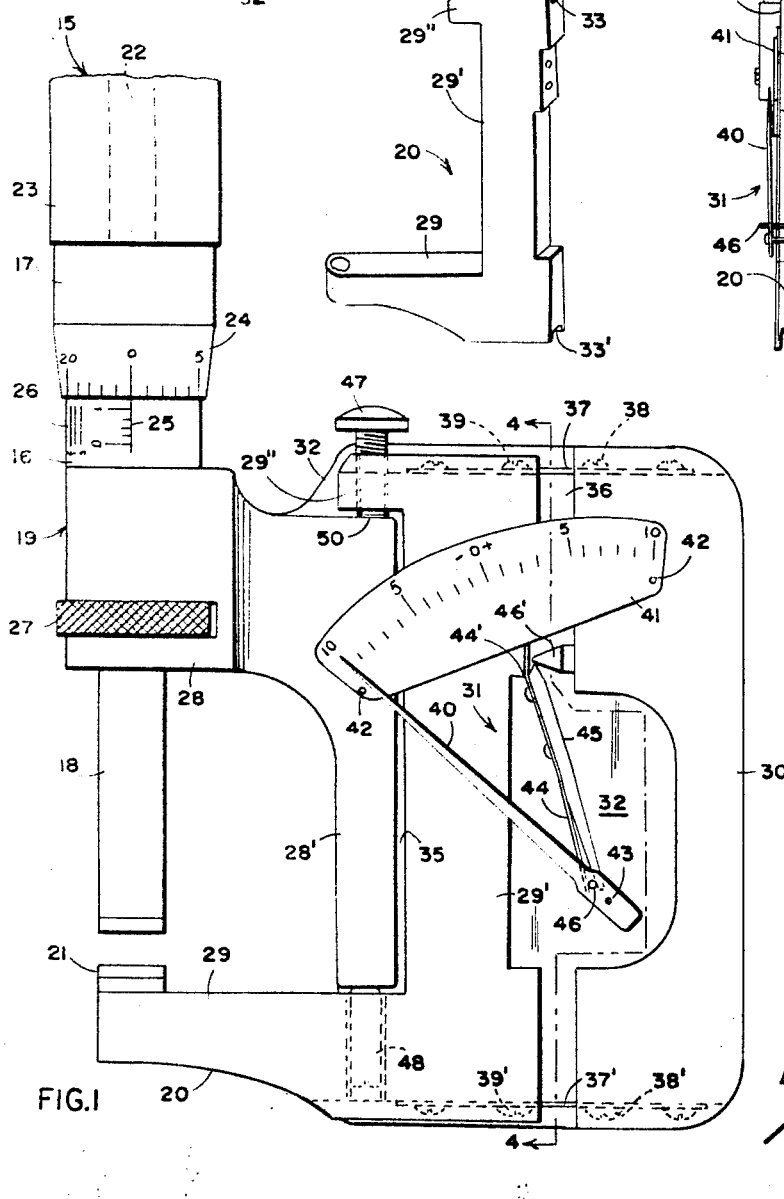
INVENTOR,
Charles Sagona,
ATTORNEY.

United States Patent Office 3,448,523
Patented June 10, 1969

3,448,523
HIGH PRECISION LENGTH-MEASURING AND
GAGING INSTRUMENTS HAVING OPTION-
ALLY-USEABLE DIAL INDICATING MEANS
Charles Sagona, 73 Bay 34th St.,
Brooklyn, N.Y. 11231
Filed Apr. 18, 1967, Ser. No. 631,743
Int. Cl. G01b 5/02
U.S. Cl. 33—147                    6 Claims

ABSTRACT OF THE DISCLOSURE

Precision indicating type linear-measuring, gaging instruments showing plus or minus variances of measuring standards, affording pointer movement adjustment with locking means to immobilize pointer indication for solid comparator gaging and to protect mechanism when idle. Indicating means utilizes a resilient distortable parallelogram structure; relative movement of parallelograms' opposite sides being translated to move a pointer across a scale, which is a magnified distance of the relative parallelogram movement. All adjustments are positive stops which do not touch delicate indicator mechanism parts. To explain the invention, it is shown incorporated in a micrometer which may be useable per se, or together with indicating means.

---

The present invention relates to high precision gaging and length-measuring instruments of the dial indicator type.

An object of this invention is to provide a novel and improved high precision length-measuring and gaging instrument of the class mentioned, whose dial indicator is adjustable to read zero when the dimension of the piece being measured is exactly the required dimension, but which will admit a piece measuring within certain limits, more or less of the required dimension, whereupon the dial indicator will read the plus or minus variance from the required dimension.

Another object thereof is to provide an instrument of the character described, in which said limits can be adjusted, so the instrument will admit a piece conforming with prescribed tolerances.

A further object is to provide an instrument of the kind set forth, in which the dial indicator can be immobilized, so the instrument can be read on its own linear scales as when no dial indicator is included.

A further object thereof is to provide a novel and improved high precision length-measuring and gaing instrument of the class mentioned, having a distortable parallelogram structure type indicating means of the sort set forth substantially in my Patent No. 2,792,802 that can be calibrated to measure or indicate in any measuring standard that is adaptable to this type of indicating mechanism; said indicating mechanism having adjustable stops to set and to limit the pointer travel across a suitable scale; the stops being designed to prevent the more delicate parts of the mechanisms from over and under travel damage, and to set plus and/or minus stops, and also to lock the pointer mechanism against movement at any point on the scale.

A further object thereof is to provide that the pointer of an indicator associated with a micrometer, can be set and adjusted to stop at zero or any other desired point on the scale, every time the micrometer is so used that a consistant dial related reading can be made from the thimble without actually locking the dial indicating mechanism.

Another object of this invention is to provide an adjustable button for moving the anvil so a piece to be measured can be received by the instrument, and then removed therefrom, free of contact with such piece. Said button can also be used as a protective stop against mechanism damage, and can also be used as the pointer adjusting means to set the limits of travel for said pointer. This adjustable button can also be manipulated to convert an indicating type comparator into a regular type liner measuring means, which is chosen for illustration herein to be a micrometer, where the readings can be taken accurately from the thimble even though the pointer mechanism is not locked, and further said button can also be resorted to be used as a locking means to protect the instrument when not in use.

Still a further object of this invention is to provide a novel and improved measuring instrument of the character set forth, having the enumerated attributes, and which can be pocket-size, easily understood and used, and which is reasonable in cost and efficient in carrying out the purposes for which it is designed.

Other objects and advantages will become apparent as this disclosure proceeds.

In the accompanying drawing forming part of this specification, similar characters of reference indicate corresponding parts in all the views.

FIG. 1 is an enlarged elevation showing a pocket micrometer embodying the teachings of this invention.

FIG. 2 is a perspective view of one of the frame parts on which is mounted the micrometer mechanism.

FIG. 3 is a perspective view of a second frame part which carries an anvil.

FIG. 4 is a section taken at lines 4—4 in FIG. 1, but drawn to the scale of the FIGS. 2 and 3.

In the drawing, the numeral 15 designates generally a micrometer mechanism with the usual barrel 16, thimble 17 and a spindle 18 on a C-frame composed of the frame parts denoted generally by the numerals 19 and 20; said micrometer mechanism 15 being carried on the frame part 19, while the frame part 20 has the anvil 21. As it usual, the end of the spindle 18 is directly opposite the face of the anvil 21. and said spindle is movable towards and away from said anvil. Said spindle 18 is part of a screw 22 extending from a head 23 which carries the thimble 17, a tubular part concentrically positioned with respect to said screw, mounted on the barrel 16 as a slidable sleeve thereon; said barrel being the nut for said screw 22. The thimble and barrel carry the usual scales or graduations 24 and 25 respectively and if desired, the barrel may have a commonly known vernier scale arrangement 26. A locking nut 27 may be included to hold the spindle 18 at any particular setting, as is well known. Each of the frame parts 19 and 20 is substantially L-shaped and they are positioned to form a C-shape whereby one arm of each of said parts 19, 20 is respectively an end arm of such C-shape, while their other arms are positioned one alongside the other. The arms of said C-shape are denoted by the numerals 28 and 29 respectively, while those arms of said parts which are alongside each other, are denoted respectively by the numerals 28′ and 29′. The spindle 18 extends through the arm 28 towards the arm 29.

The numeral 30 designates another frame part which is spaced a little from the arm 29′, which arm is intermediate the arm 28′ and said frame part 30. This frame part 30 is a C-shape positioned in the same direction as the C-shape formed by the frame parts 19 and 20, to provide room for components of the dial indicator means indicated generally by the numeral 31. The frame parts 19 and 30 are securely mounted on a back plate 32, but the frame part 20 is slightly spaced from said plate. The frame part 20 presents a pair of opposite surfaces 33, 33′, while the frame part 30 presents the pair of opposite surfaces 34, 34′. These surfaces may be the floors of channels as shown, and are preferably perpendicular to the axis of the spindle 18. The distance between the surfaces 33, 33' is equal to the distance between the surfaces 34, 34'. There is a space 35 between those surfaces of the arms 28' and 29' which are opposite each other, and there is a space 36 between those surfaces of the arm 29' and the frame part 30, which are opposite each other. Across the space 36, the frame parts 20 and 30 are spanned by a blade spring 37 lying on the surfaces 33 and 34, and by a blade spring 37' of identical kind, lying on the surfaces 33' and 34'. These springs are secured in place by screws. The screw 38 is in alignment with the screw 38', while the screw 39 is in alignment with the screw 39'. It is evident that the frame part 20 is yieldingly mounted on the frame part 30 because of their joinder by said strap springs 37, 37', for movement along a line parallel to the axis of the micrometer spindle 18, in a direction whereby the distance between the spindle end and the anvil 21 is increased slightly. In any event, the opposite faces of said spindle and anvil do remain absolutely parallel. The movement of part 20 is measured as indicated by a pointer 40 moving across a graduated scale card 41, which extends across and spaced from the arm 29', and is secured by the screws 42 through enlarged holes in the card, to the stationary frame parts 19 and 30, thus affording provision to shift it into proper position. Its graduations are in one-ten thousandths of an inch. An axis pin 43 extending from the back plate 32, carries the swingable pointer 40 slightly spaced from said scale card, whose middle graduation mark designates "zero," and there are plus readings up to ten to the right of zero, and minus readings up to 10 to the left of zero. The arm 29' carries a cantilever blade spring 44 on which extends the element 45 forming a clamp therewith, engaging the pin 46 extending laterally from the pointer 40, a short distance from the axis pin 43. The upper edge of said element 45 is in contact with an adjustable pin 46' near the fulcrum point 44' about which the blade spring 44 bends. This blade spring is in flexed condition. When the pointer 40 is at zero, the distance between the spindle 18 and the anvil 21 is that indicated on the micrometer scales 24, 25, 26.

It is evident that the indicator means 31 is of the type utilizing a distortable resilient parallelogram offered by the assembly of the blade springs 37, 37' as two of its opposite sides, while the arm 29' and the frame part 30 constitute the other two opposite sides. The relative movement of said opposite sides is translated to move the pointer 40 across the scale card 41, a distance which is a magnification of such relative movement of the parallelogram sides. It will be recognized from the prior art that the indicator means 31 is substantially the construction set forth in my Patent No. 2,792,802, which is referred to for the explanation of its manner of operation. Those versed in this art will readily comprehend without further illustration, that the present invention is applicable to be incorporated in all sorts of length-measuring instruments, as snap gages, height gages and vernier calipers, and another distortable parallelogram indicating mechanism useable herein, is shown in my Patent No. 2,674,806.

The distal end of the arm 29' has a lateral projection 29" which overhangs the arm 28 and carries the button-headed adjustment screw 47 in alignment with the adjustment screw 48, which latter is threaded in the arm 29, and normally bears against the distal end of the arm 28'. The button screw 47, as it will be called herein, is normally spaced from the arm 28. The setting of the adjustment screw 48 determines the position of the pointer 40, in normal rest condition of this measuring instrument. The setting of the button screw 47 determines the extent of sweep of the pointer 40 across the scale card 41. These stop-determining screws protect the indicator mechanism from damage, for they limit their movement without touching delicate parts and their mountings.

In this measuring instrument, when the micrometer 15 is set to read zero on its scales 24, 25, 26, the setting is such that its spindle 18 contacts the anvil 21, and the adjustment of the screw pin 46' is such that the pointer 40 will read zero on the scale card 41. This set up at zero reading of the micrometer scales is first established after locking the spindle 18 by use of the locking nut 27. Then, if it is desired to use the micrometer 15 per se, as the owner would do in instances where high precision measurements are not required, as in instances where the tolerances to be considered are more than plus or minus 0.001", just turn the button screw 47 down until it stops against the arm 28. Then turn the button screw 47 until the pointer 40 stops at zero. Then lock the pointer in place, by screwing up the screw 48, to bear against the frame part 19. This immobilizes the indicator means 31 at the zero point on the scale card 41, where it must be if an accurate reading is to be expected from the thimble scales 24, 25, 26. The zero position on the thimble is accurate only when the pointer is also at zero on the scale card. The micrometer now, as ordinarily, is only used as a solid measuring comparator, without dial indication. However, the dial indicator need not be immobilized in order to measure as mentioned above. All that would be necessary is to press and turn the button screw 47 downward until the pointer 40 stopped at zero, so that when a piece is measured between the anvil and spindle faces, the pointer will stop at zero, thus affording an accurate dial-related reading off the thimble, every time the micrometer is so used. In this instance, it is not necessary to use the bottom screw 48 as a locking means.

To use this instrument so that the indicating means 31 is active, raise the button screw 47. Then adjust the screw 48 to move the pointer 40 to read the minus limit on the scale card 41. This will flex the springs 37, 37' and resiliently hold the screw 48 against the bottom of the arm 28'. Then press on the button screw 47 to contact the arm 28, and turn the screw 47 until the pointer 40 reads the plus limit on the card scale. When the hold on the screw 47 is released, the flexed springs 37, 37' will return the pointer 40 to the minus position on the scale card 41, leaving some space between the bottom of the screw 47 and the frame member 19, as indicated at 50. To insert the piece to be measured, adjust the micrometer 15 to read the required dimension. Then lock the spindle with locknut 27. Then press down on the button screw 47 to increase the distance between the spindle 18 and the anvil 21, which will facilitate placing such piece between them. Now release hold on the screw 47, whereupon the movable frame member 20 will move towards the fixed frame member 19. The piece will be clamped by the spindle and anvil, and the pointer will move on the scale 41, to show the actual dimension of the piece when its reading is added to the setting of the micrometer, that is, said pointer reading will show the variance in dimension. If the piece measured actually is the reading on the micrometer scales, then the pointer 40 will be on zero of the scale card 41.

A transparent panel, not shown, may be provided in front of and spaced a bit from the mechanism 31, as a protective cover therefor, which may be secured to the frame part 30. Instead of the micrometer 15, there may be a slideable graduated blade positionable by a set screw, in place of the lock nut 27, which blade would form a caliper with the anvil. The blade may be provided with a caliper jaw, and the arm 29 may serve as the other jaw. All this is believed evident to one versed in the art, and needs no further illustration.

Of course, this invention may be embodied in an indicator mechanism per se, featuring the immobilization feature, in which event, only the arm 28' and the frame part 30 are used of the structure 19, and all to the left of said arm in FIG. 1, as well as all of the member 20 to the left of said arm 28', are omitted, and the head of the screw 47 serves as the feeler of the indicator, for general use in all manners an indicator is utilized.

To facilitate definition of structure in the appended claims, the instrument is described in the position it is shown in FIG. 1.

This invention is capable of numerous forms and various applications without departing from the essential features herein disclosed.

I claim:

1. In a high precision length-measuring and gaging instrument of the character described, the combination of an inverted first L-shaped frame member comprised of an upright arm and an arm extending laterally of said upright arm, an uprightly extending second frame member opposite said upright arm of the first member, means mounting said members as a frame of unitary structure, an upright L-shaped third member comprised of an upright arm, an upper projection and a lower arm both extending laterally of the last-mentioned upright arm, said upright arm being positioned intermediate said first and second members and spaced therefrom; said L-shaped members forming a C-shaped structure, a pair of spaced parallel blade springs securely mounted to and across the space between said second and third members at opposite ends thereof whereby on movement of the third member relative to the second member, said springs always remain parallel, a rotatably mounted pointer on the frame, a scale on the frame for said pointer to travel across, means for translating the relative movement of said second and third members so that the pointer moves a distance which is a magnification of said relative movement, an elongated upright member, longitudinally mounted through the laterally extended arm of the first member; the lower end of said upright member being opposite to and movable toward and away from the laterally extending arm of the third member, means on the first member to hold the position of said movable member thereon, a first adjustment screw through the laterally extending arm of the third member, adapted to contact the lower end of the upright arm of the first member, and a second adjustment screw extending through the upper projection of the upright arm of the third member, adapted to contact the upper surface of the first member.

2. An instrument as defined in claim 1, wherein said adjustment screws are in alignment.

3. An instrument as defined in claim 1, including a micrometer of the type including a C-frame and a spindle; said C-frame constituting the said C-shaped structure, and the spindle constituting said movable member.

4. An instrument as defined in claim 3, wherein said holding means comprises means for locking said spindle included in said micrometer.

5. An instrument as defined in claim 1, wherein said upper projection comprising an element overhanging the first member, and wherein the second adjustment screw is through said overhanging element and said screws are in alignment.

6. An instrument as defined in claim 1, wherein the motion-translating means is positioned between the second and third members.

References Cited

UNITED STATES PATENTS 1,963,310 6/34 Nichols.
2,674,806 4/54 Sagona.
2,792,802 5/57 Sagona.

SAMUEL S. MATTHEWS, *Primary Examiner.*